United States Patent
Peacock et al.

(10) Patent No.: US 9,162,932 B2
(45) Date of Patent: Oct. 20, 2015

(54) FERTILIZER COMPOSITION AND METHOD FOR PREPARING THE SAME

(71) Applicant: MOS Holdings Inc., Plymouth, MN (US)

(72) Inventors: Lawrence Alan Peacock, Riverview, FL (US); Dan M. Froehlich, White Bear Lake, MN (US)

(73) Assignee: The Mosaic Company, Plymouth, MN (US)

( * ) Notice: Subject to any disclaimer, the term of this patent is extended or adjusted under 35 U.S.C. 154(b) by 0 days.

(21) Appl. No.: 14/212,456

(22) Filed: Mar. 14, 2014

(65) Prior Publication Data

US 2014/0260467 A1 Sep. 18, 2014

Related U.S. Application Data

(60) Provisional application No. 61/782,377, filed on Mar. 14, 2013.

(51) Int. Cl.
*C05B 7/00* (2006.01)
*C05G 3/00* (2006.01)

(52) U.S. Cl.
CPC ................ *C05G 3/0058* (2013.01); *C05B 7/00* (2013.01)

(58) Field of Classification Search
USPC ...................................... 71/34, 48, 53, 64.04
See application file for complete search history.

(56) References Cited

U.S. PATENT DOCUMENTS

| | | | | |
|---|---|---|---|---|
| 2,935,387 | A * | 5/1960 | Phillips | 23/313 R |
| 3,005,696 | A * | 10/1961 | Higuett et al. | 71/64.03 |
| 3,135,473 | A * | 6/1964 | Schrader et al. | 241/3 |
| 3,794,478 | A | 2/1974 | Dirksen | |
| 3,961,932 | A | 6/1976 | Miller | |
| 4,025,329 | A * | 5/1977 | Goertz | 504/101 |
| 4,045,204 | A | 8/1977 | Matsunaga | |
| 4,154,593 | A * | 5/1979 | Brown et al. | 71/33 |
| 4,758,261 | A * | 7/1988 | Parker et al. | 71/34 |
| 4,789,391 | A * | 12/1988 | Detroit | 71/27 |
| 4,832,728 | A * | 5/1989 | Allan et al. | 71/29 |
| 5,120,345 | A * | 6/1992 | Kayaert et al. | 71/30 |
| 5,630,861 | A | 5/1997 | Yaniv | |
| 5,653,782 | A * | 8/1997 | Stern et al. | 71/53 |
| 6,179,893 | B1 * | 1/2001 | Bendix et al. | 71/28 |
| 6,241,796 | B1 | 6/2001 | Jardine | |
| 6,254,655 | B1 * | 7/2001 | Goertz | 71/28 |

(Continued)

OTHER PUBLICATIONS

PCT Search Report and Written Opinion dated Jul. 28, 2014 for PCT Application No. PCT/US2014/028565 filed Mar. 14, 2014, 12 pages.

(Continued)

*Primary Examiner* — Wayne Langel
(74) *Attorney, Agent, or Firm* — Patterson Thuente Pedersen, P.A.

(57) ABSTRACT

A method of producing a granulated and compacted fertilizer having incorporated micronutrients in which the granulated primary nutrient and micronutrients are mixed at smaller particle sizes before being compacted into a larger, easier to handle particle sizes.

13 Claims, 1 Drawing Sheet

(56) References Cited

U.S. PATENT DOCUMENTS

| | | |
|---|---|---|
| 6,379,414 B1 | 4/2002 | Kleine-Kleffmann et al. |
| 6,517,600 B1 | 2/2003 | Dinel |
| 6,544,313 B2 | 4/2003 | Peacock et al. |
| 6,936,087 B2 | 8/2005 | Wommack et al. |
| 7,497,891 B2 | 3/2009 | Peacock |
| 7,727,501 B2 | 6/2010 | Ferguson et al. |
| 7,789,932 B2 | 9/2010 | Anderson et al. |
| 8,282,898 B2 | 10/2012 | Phinney |
| 8,323,371 B2 * | 12/2012 | Phinney .............................. 71/63 |
| 2002/0178772 A1 | 12/2002 | Hince |
| 2009/0270257 A1 | 10/2009 | Pursell et al. |
| 2010/0040882 A1 | 2/2010 | Phinney |
| 2010/0240533 A1 | 9/2010 | Varadachari |
| 2012/0036906 A1 | 2/2012 | Pedersen |
| 2013/0031943 A1 | 2/2013 | Ferguson et al. |

OTHER PUBLICATIONS

Application and File History for U.S. Appl. No. 13/567,645, filed Aug. 6, 2012, inventor Ferguson et al.

Swift Brochure, known to Applicant at least as of Nov. 19, 2013, 3 pages.

Korn-Kali®+B Technical Data Sheet, Mar. 15, 2012, 1 page.

Malaysia and Indonesia: Korn-Kali+B—A four nutrient Fertiliser for the Oil Palm, Dec. 17, 2008, 2 pages.

PCT Search Report dated Feb. 22, 2013 for PCT Application No. PCT/US2012/049301 filed Aug. 2, 2012, 10 pages.

International Preliminary Report on Patentability dated Feb. 4, 2014 for PCT Application No. PCT/US2012/049301 filed Aug. 2, 2012, 7 pages.

* cited by examiner

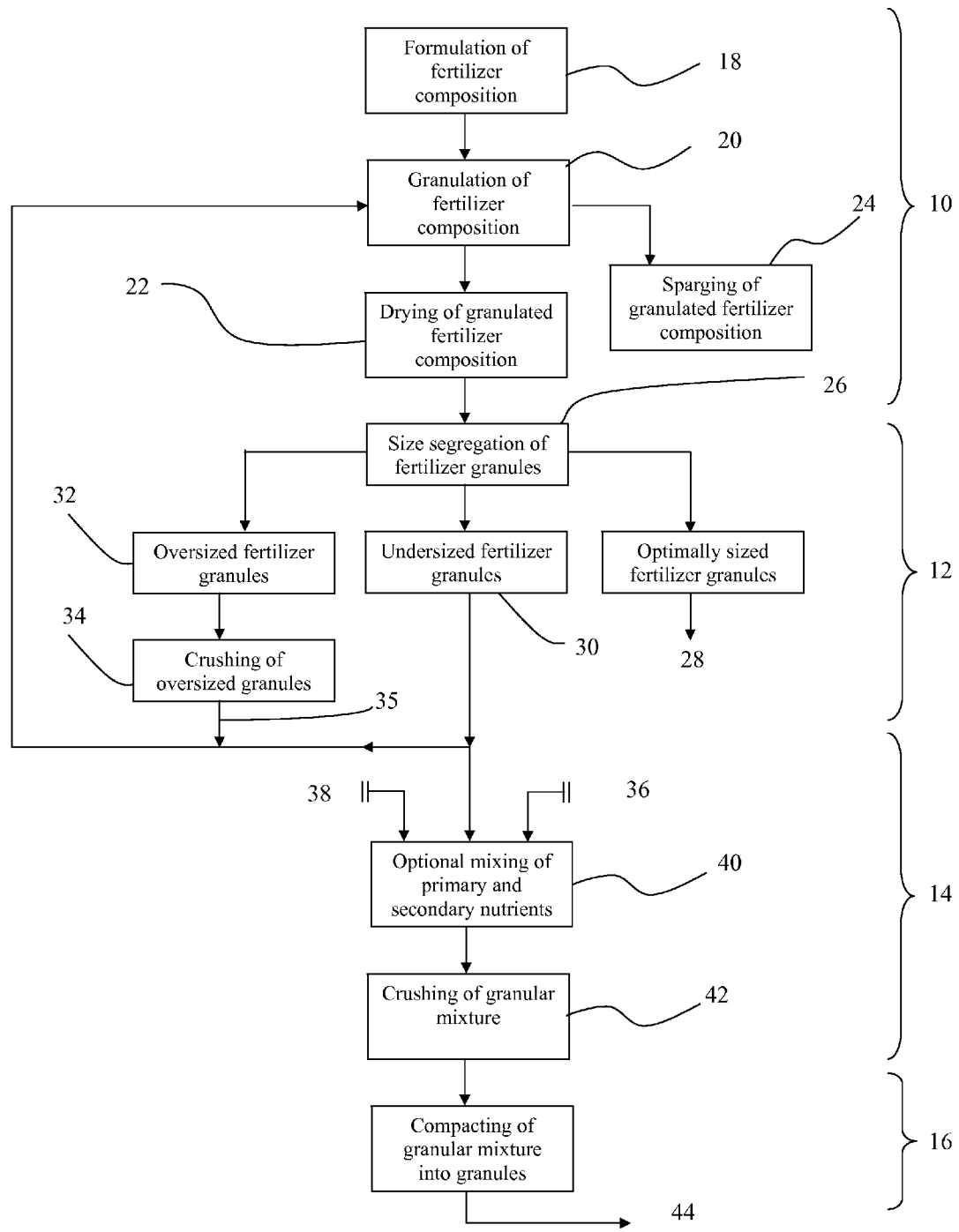

FERTILIZER COMPOSITION AND METHOD FOR PREPARING THE SAME

PRIORITY CLAIM

The present application claims priority to U.S. Provisional Application Ser. No. 61/782,377, filed Mar. 14, 2013, and entitled "FERTILIZER COMPOSITION AND METHOD FOR PREPARING THE SAME", which is herein incorporated by reference in its entirety.

FIELD OF THE INVENTION

The present invention is generally directed to granulated fertilizer having incorporated micronutrients. Specifically, the present invention is directed to a compacted granulated fertilizer and an associated process for forming the compacted granulated fertilizer.

BACKGROUND OF THE INVENTION

Many chemical elements, including both mineral and non-mineral elements, are important for a plant's growth and survival. The non-mineral elements can include, for example, hydrogen, oxygen, and carbon, typically available from the surrounding air and water. The mineral nutrients, including nitrogen, phosphorous, and potassium are available or made available in the soil for uptake by the plant's roots.

The mineral nutrients can generally be divided into two groups: macronutrients, including primary nutrients and secondary nutrients, and micronutrients. The primary mineral nutrients include nitrogen (N), phosphorous (P), and potassium (K). Large amounts of these nutrients are essential to a plant's survival, and therefore typically make up the majority of a fertilizer composition. In addition to primary nutrients, secondary nutrients are required in much smaller amounts than those of the primary nutrients. Secondary nutrients can include, for example, calcium (Ca), sulfur (S), and magnesium (Mg). Micronutrients can include, for example, boron (B), copper (Cu), iron (Fe), manganese (Mn), molybdenum (Mo), zinc (Zn), chlorine (Cl), cobalt (Co), sodium (Na), and combinations thereof.

Particular to micronutrients, micronutrient sources vary considerably in their physical state, chemical reactivity, cost, and availability to plants. The most common method of micronutrient application for crops is soil application. Recommended application rates usually are less than 10 lb/acre on an elemental basis so uniform application of micronutrient sources separately in the field can be difficult. Including micronutrients with mixed fertilizers is a convenient method of application and allows more uniform distribution with conventional application equipment. Costs also are reduced by eliminating a separate application step. Four methods of applying micronutrients with mixed fertilizers can include incorporation during manufacture, bulk blending with granular fertilizers, coating onto granular fertilizers, and mixing with fluid fertilizers.

Incorporation during manufacture is the incorporation of one or more micronutrients directly in fertilizers granules, such as NPK, potash, or phosphate fertilizers, as they are being produced. This practice allows each granule of fertilizer to have a consistent concentration of the desired micronutrient(s) and uniform distribution of the micronutrient(s) throughout the granular fertilizers. Because the granules are evenly dispersed over the growing area, the contained micronutrient(s) are as well.

Bulk blending with granular fertilizers is the practice of bulk blending separately granulated secondary nutrients and/or micronutrient compounds with granular fertilizers, such as phosphate or potash fertilizers. The main advantage to this practice is that fertilizer grades can be produced which will provide the recommended micronutrient rates for a given field at the usual fertilizer application rates. The main disadvantage is that segregation of nutrients can occur during the blending operation and with subsequent handling. In order to reduce or prevent size segregation during handling and transport, the micronutrient granules must be close to the same size as the phosphate and potash granules. Because the micronutrients are required in very small amounts for plant nutrition, this practice has resulted in granules of micronutrients unevenly distributed and generally too far from most of the plants to be of immediate benefit as most migrate in soil solution only a few millimeters during an entire growing season.

Coating of granular fertilizers decreases the possibility of segregation. However, some binding materials are unsatisfactory because they do not maintain the micronutrient coatings during bagging, storage, and handling, which results in segregation of the micronutrient sources from the granular fertilizer components. Steps have been taken to reduce the segregation problem in the case secondary nutrients and micronutrients, for example as in the case of sulfur or sulfur platelets in the fertilizer portion as described in U.S. Pat. No. 6,544,313 entitled "Sulfur-Containing Fertilizer Composition and Method for Preparing Same" and in the case of micronutrients as described in U.S. Pat. No. 7,497,891 entitled, "Method for Producing a Fertilizer with Micronutrients," both of which are incorporated herein by reference in their entireties.

There remains a need for a fertilizer product that contains one or more micronutrients that maximizes the introduction of the micronutrient(s) into soil solution and ultimately to the root zone of plants.

SUMMARY OF THE INVENTION

Embodiments of the present invention are directed to a compacted fertilizer composition, and related methods of making, having at least one primary nutrient and at least one additional nutrient that are crushed to increase an available reactive surface area and which are then compacted into granules of the fertilizer composition.

In an embodiment of the present invention, a base fertilizer composition containing at least one primary nutrient is formulated separately and sized segregated to identify undersized granules that are unsuited for use in conventional fertilizer products. At least one additional nutrient, for example, a secondary nutrient, a micronutrient or a micronutrient complex can be added and mixed into the undersized granules. The mixture of the undersized granules and at least one additional nutrient can then be crushed to increase an available reactive surface area of the primary nutrient and at least one additional nutrient. The crushed mixture can then be compacted to form a compacted fertilizer granule having the primary nutrient and the at least one additional nutrient. As the compacted fertilizer granule breaks down, the available surface area of the crushed primary nutrient and the at least one additional nutrient allows for maximum introduction and reaction in the root zone By premixing the undersized fertilizer granules with the at least one additional nutrient, the at least one additional nutrient can be evenly distributed throughout the undersized granules to provide the correct concentration or ration of primary nutrients to additional nutrients in the mixture. As a result, the concentration of primary and additional nutrient is consistent when the compacted fertilize granules are formed to provide even distribution over an area that the compacted fertilizer granules are distributed. In one aspect, the compacted granules can be adapted to break down into constituent granules, primary and additional nutrient granules, in the soil. In this configuration, the compacted fertilizer granules serve as a carrier to ensure a proper distribution of primary and additional nutrients are distributed over the field before releasing the constituent primary and additional nutrient granules that were previously crushed to maximize the possible reactive surface area.

A method of producing a fertilizer, according to an embodiment of the present invention, comprises generating a quantity of a base fertilizer composition including at least one primary nutrient. In one particular embodiment, the base fertilizer composition comprises a phosphate fertilizer such as, for example, monoammonium phosphate (MAP) or diammonium phosphate (DAP), such that the primary nutrient is phosphorous.

The method further comprises granulating the quantity of base fertilizer composition into a plurality of fertilizer granules that can be size segregated into optimally sized granules, oversized granules and undersized granules. In one aspect, the method comprises adding and bulk mixing at least one additional nutrient, such as, for example, at least one secondary nutrient or at least one additional micronutrient or micronutrient complex into the undersized granules to form a fertilizer mixture. The method can further comprise crushing the fertilizer mixture to form a crushed fertilizer mixture having the primary nutrient and at least one additional nutrient Finally, the method can further comprise compacting the crushed fertilizer mixture to form a plurality of compacted fertilizer granules having the primary nutrient and the at least one additional nutrient.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which:

FIG. 1 is a schematic flow diagram of a method of producing granulated fertilizer according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

As shown in FIG. 1, a method for producing a quantity of compacted fertilizer granules, according to an embodiment of the present invention, generally comprises a production stage 10, a size segregation/correction stage 12, a mixing stage 14 and a compacting stage 16.

As shown in FIG. 1, the production stage 10 can further comprise a formulation step 18, a granulation step 20 and a drying step 22. In the formulation step 18, a quantity of fertilizer, such as, for example, a phosphate fertilizer or an ammonium phosphate fertilizer, is at least partially chemically produced in a pre-neutralizer and/or reactor. The fertilizer can include, but is not limited to MAP or DAP, or triple super phosphate fertilizers and combinations thereof.

In one embodiment, formulation step 18 comprises a pre-neutralizer which is a stirred reactor that produces a slurry of ammonium phosphate. For example, MAP and/or DAP can be produced depending on the ratio of ammonia and phosphoric acid fed to the pre-neutralizer.

In another embodiment of the invention, formulation step 18 comprises a pipe reactor, such as a pipe cross reactor, which is a pipe-shaped reactor where ammonium phosphate is formed by reacting ammonia and phosphoric acid. As with the pre-neutralizer, either MAP and/or DAP can be produced depending on the ratio of ammonia and phosphoric acid fed to the pipe reactor.

In yet another embodiment of the invention, formulation step 18 comprises a combination of a pre-neutralizer and a pipe reactor, in which a portion of the ammonium phosphate fertilizer is formed in the pre-neutralizer, and another portion is formed in the pipe reactor, such as described in U.S. Pat. No. 7,497,891, previously incorporated into reference in its entirety.

In the granulation step 20, the produced fertilizer composition is rotated in a rotating granulation drum to form a rolling bed of fertilizer granules. For ammonium phosphate fertilizers, the production stage 10 can further comprise a sparging step 24 in which the fertilizer granules are treated in an under-bed ammonia sparger to complete the ammonium phosphate reaction. In the drying step 22, the fertilizer granules are dried to reduce the moisture content and to drive off any unreacted volatiles.

As shown in FIG. 1, the size segregation/correction stage 12 can further comprise a product sizing step 26 in which the granulated fertilizer is split into a plurality of streams according to particle size. In the product sizing step 26, the quantity of fertilizer granules are passed through a plurality of sizing screens to split the fertilizer granules into an optimally sized granule stream 28, an undersized granule stream 30, and an oversized granule stream 32. The correctly sized stream 28 comprises fertilizer granules having particle sizes from about 2 mm to about 4 mm in diameter. The undersized stream 30 comprises fertilizer granules having a particle size less than about 2 mm in diameter. The oversized granule steam 32 comprises fertilizer granules having particle sizes greater than about 4 mm in diameter. The oversized granule stream 32 can undergo a crushing step 34, to form a crushed recycle stream 35 wherein the particle size of the crushed recycle stream 35 is than about 4 mm in diameter. The crushed recycle stream 35 and a portion of the undersized stream 34 can be recycled to the granulation step 20 to function as a heel during the granulation step 20 and to provide a building block for granule formation.

In the mixing stage 14, one or more additional nutrient streams having additional nutrients such as, for example, a micronutrient stream 36 having one or more micronutrients or micronutrient complexes and/or a secondary nutrient stream 38 having one or more secondary nutrients are combined with the remaining portion of the undersized granule stream 30 that was not recycled to the granulation step 20. The micronutrient stream 36 and/or the secondary nutrient stream 38 are mixed in to the undersized granule stream 30 to form a fertilizer mixture 40 in which the additional nutrients are evenly distributed through the fertilizer mixture 40.

A concentration of each micronutrient in the fertilizer mixture can be from about 0.1 to about 3% by weight. The micronutrient stream 36 can comprise at least one micronutrient including, but not limited to boron, copper, iron, manganese, molybdenum, zinc and combinations hereof. In one aspect, the micronutrients in the micronutrients stream 36 can have a particle size from about 50 to about 150 µm, and more particularly from about 75 µm to about 100 µm such that the resulting fertilizer mixture 40 is generally homogenous.

The secondary nutrient stream 38 can include, but is not limited to, ammonium sulfate, calcium sulfates, elemental sulfur and combinations thereof. In one embodiment, the secondary nutrients in the secondary nutrient stream 38 can have a particle size from about 50 to about 150 µm, and more particularly from about 75 µm to about 100 µm such that the resulting fertilizer mixture 40 is generally homogenous.

Size segregation/correction stage 12 can further include a crushing step for the fertilizer mixture 40 to form a crushed fertilizer mixture 42 with mixture particles having a particle size from about 50 to about 150 µm, and more particularly from about 50 µm to about 100 µm that are similar in size to the additional nutrients, such as, for example, micronutrient and/or secondary nutrients in micronutrient stream 38 to promote efficiency of downstream compaction, and further homogeneity of the final compacted product.

In an alternative embodiment, a secondary nutrient can be added during production stage 10 and before addition of micronutrients. For example, molten sulfur can be applied to or sprayed on the base fertilizer composition in the granulator as set forth in U.S. Pat. No. 6,544,313 entitled "Sulfur-Containing Fertilizer Composition and Method for Preparing Same", incorporated herein by reference in its entirety. Alternatively, if the secondary nutrient is added as a separate component after granulation and/or sizing of the base fertilizer composition, in this configuration, the mixing stage 14 can further comprise a crushing step in which the undersized granule stream 30 and a secondary nutrient mixture is crushed or pulverized and blended into a homogenous mixture of primary and secondary nutrient particles prior to being combined with the micronutrient stream 36.

In the compacting stage 16, the crushed fertilizer mixture 42 is compacted into larger granules that can be more readily transported and handled. Optionally, one or more binding agents or ingredients can be added to the crushed fertilizer mixture 42 in order to improve the strength or handling ability of a finished, compacted fertilizer granule 44 or granular product, such that the compacted fertilizer granules 44 are less likely to wear or break down during handling or transport, as described in U.S. Pat. No. 7,727,501, entitled "Compacted granular potassium chloride, and method and apparatus for production of same," incorporated herein by reference in its entirety. The binding agent is a chemical that is added into the feed of a compaction circuit to improve the strength and quality of compacted particles. The binding agent acts to sequester or chelate impurities in the fertilizer composition, while providing adhesive properties to the compacted blend. Binding agents can include, for example, sodium hexametaphosphate (SHMP), tetra-sodium pyrophosphate (TSPP), tetra-potassium pyrophosphate (TKPP), sodium tri-polyphosphate (STPP), potassium silicate, sodium silicate, starch, dextran, lignosulfonate, bentonite, montmorillonite, kaolin, or combinations thereof. In addition to or alternatively to the binding agents, some of the micronutrients themselves can act as binding agents to improve particle strength.

The compaction process can be performed using conventional compaction equipment such as a roll compactor or the like. The cohered intermediate yielded can then be further processed into the desired finished granular product using methods such as crushing, screening or other conventional classification methods suitable to yield a finished product of the desired particle size or type, as discussed above.

Following the compaction process, the compacted fertilizer granule 44 can have a particle size diameter from about 2 mm to about 4 mm diameter. In one aspect, the compacted fertilizer granules 46 are adapted to break down in the soil into the constituent granules of the primary nutrient, secondary nutrient and/or micronutrient to increase surface area for interaction with the plant roots.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A process for forming a compacted phosphate fertilizer granule, comprising:
   producing a slurry of ammonium phosphate;
   granulating the slurry to produce phosphate fertilizer granules;
   sorting the fertilizer granules by size into optimally sized granules, oversized granules and undersized granules;
   crushing the undersized granules to form a crushed granule stream; and
   compacting the crushed granule stream to form a compacted phosphate fertilizer granule.

2. The process of claim 1, wherein the compacted fertilizer granule has a compacted fertilizer granule diameter from about 2 mm to about 4 mm.

3. The process of claim 1, wherein the optimally sized granules have an optimally sized granule diameter from about 2 mm to about 4 mm, the oversized granules have an oversized granule diameter greater than about 4 mm and the undersized granules have an undersized granule diameter less than about 2 mm.

4. The process of claim 1, further comprising:
   adding at least one additional nutrient to the undersized granules.

5. The process of claim 4, wherein the at least one additional nutrient is selected from the group consisting of secondary nutrients, micronutrients and combinations thereof.

6. The process of claim 5, wherein the at least one additional nutrient comprises one or more secondary nutrients selected from the group consisting of: ammonium sulfate, calcium sulfate, elemental sulfur, and combinations thereof.

7. The process of claim 5, wherein the at least one additional nutrient comprises one or more micronutrients selected from the group consisting of: boron, copper, iron, manganese, molybdenum, zinc, complexes thereof, and combinations thereof.

8. The process of claim 5, wherein the at least one additional nutrient has a nutrient particle size diameter from about 50 µm to about 150 µm.

9. The process of claim 1, wherein the step of compacting the crushed granule stream, further comprises:

adding a binding agent to the crushed granule stream fertilizer mixture to improve adhesion of the compacted fertilizer granule.

10. The process of claim 1, further comprising:
crushing the oversized granules; and
recycling the crushed, oversized granules to the granulation step.

11. The process of claim 10, further comprising:
recycling a portion of the undersized granules to the granulation step.

12. The process of claim 1, wherein the step of granulating the slurry, further comprises:
introducing the slurry into a rotating granulation drum to form a rolling bed of fertilizer granules; and
sparging the rolling bed of fertilizer granules with ammonia.

13. The process of claim 1, wherein the phosphate fertilizer granules comprise monoammonium phosphate (MAP), diammonium phosphate (DAP), or combinations thereof.

* * * * *